United States Patent
Chapelle et al.

(10) Patent No.: US 8,671,093 B2
(45) Date of Patent: Mar. 11, 2014

(54) CLICK MODEL FOR SEARCH RANKINGS

(75) Inventors: Olivier Chapelle, Mountain View, CA (US); Anne Ya Zhang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1207 days.

(21) Appl. No.: 12/273,425

(22) Filed: Nov. 18, 2008

(65) Prior Publication Data

US 2010/0125570 A1    May 20, 2010

(51) Int. Cl.
    *G06F 17/30* (2006.01)
(52) U.S. Cl.
    USPC .......................... 707/723; 707/776
(58) Field of Classification Search
    USPC .......................... 707/707, 723, 776
    See application file for complete search history.

(56) References Cited

U.S. PATENT DOCUMENTS

| | | | |
|---|---|---|---|
| 7,197,497 B2 | 3/2007 | Cossock et al. | |
| 2004/0215606 A1* | 10/2004 | Cossock | 707/707 |
| 2007/0255689 A1* | 11/2007 | Sun et al. | 707/707 |
| 2009/0089274 A1 | 4/2009 | Chapelle | |
| 2009/0106221 A1* | 4/2009 | Meyerzon et al. | 707/705 |
| 2010/0306051 A1* | 12/2010 | Lee et al. | 705/14.49 |
| 2011/0029518 A1* | 2/2011 | Tong | 707/736 |

OTHER PUBLICATIONS

Beal, M. and Ghahraman, Z. Variational bayesian learning of directed graphical models with hidden variables. Bayesian Analysis, 1(4):793-832, 2006.
Burges, C., Shaked, T., Renshaw E., Lazier, A., Deeds, M., Hamilton, N. and Hullender, G. Learning to rank using gradient descent. In Proceedings of the 22nd international conference on Machine learning, pp. 89-96, 2005.
Cao, Y., Xu, J., Liu, T.-Y., Li, H., Huang, Y. and Hon., H.-W. Adapting ranking svm to document retrieval. In Proceedings of the 29th annual international ACM SIGIR conference on Research and development in information retrieval, 2006.
Carterette, B. and Jones, R. Evaluating search engines by modeling the relationship between relevance and clicks. In J.C. Platt, D. Koller, Y. Singer, and S. Roweis, editors, Advances in Neural Information Processing Systems 20, pp. 217-224. MIT Press, 2008.
Craswell, N., Zoeter, O., Taylor, M. and Ramsey, B. An experimental comparison of click position-bias models. In WSDM '08: Proceedings of the international conference on Web search and web data mining, pp. 87-94. ACM, 2008.

(Continued)

*Primary Examiner* — Robert Beausoliel, Jr.
*Assistant Examiner* — Alexandria Bromell
(74) *Attorney, Agent, or Firm* — Hickman Palermo Truong Becker Bingham Wong LLP; Karl T. Rees

(57) ABSTRACT

Approaches and techniques are discussed for ranking the documents indicated in search results for a query based on click-through information collected for the query in previous query sessions. According to an embodiment of the invention, when calculating a relevance score for a particular document, one may overcome positional bias by utilizing click-through information about other documents previously returned in the same search results as the particular document. According to an embodiment, one may utilize Dynamic Bayesian Network, based on said click-through information, to model relevance. According to an embodiment of the invention, one may utilize click-through information to generate targets for learning a ranking function.

29 Claims, 7 Drawing Sheets

(56) References Cited

OTHER PUBLICATIONS

Dupret, G. and Piwowarski, B. User browsing model to predict search engine click data from past observations. In SIGIR 08: Proceedings of the 31st Annual International Conference on Research and Development in Information Retrieval, 2008.

Ghahramani, Z. Learning dynamic bayesian network. In C. L. Giles and M. Gori, editors, Adaptive processing of temporal information, Lecture notes in artificial intelligence. Springer-Verlag, 1998.

Jarvelin, K. and Kekalainen, J. Cumulated gain-based evaluation of IR techniques. ACM Transactions on Information Systems, 20(4):422-446, 2002.

Joachims, T. Optimizing search engines using clickthrough data In ACM SIGKDD Conference on Knowledge Discovery and Data Mining (KDD), pp. 133-142, 2002.

Richardson, M., Dominowska, E. and Ragno, R. Predicting clicks: estimating the click-through rate for new ads. In WWW '07: Proceedings of the 16th international conference on World Wide Web, pp. 521-530. ACM, 2007.

Robertson, S.E. and Walker, S. Some simple effective approximations to the 2-poisson model for probabilistic weighted retrieval. In Proceedings of the 17th annual international ACM SIGIR conference on Research and development in informat ion retrieval, 1994.

Zhang, V. and Jones, R. Comparing click logs and editorial labels for training query rewriting. In Query Log Analysis: Social and Technological Challenges. A workshop at the 16th International World Wide Web Conference, 2007.

Zheng, Z., Zha, H., Zhang, T., Chapelle, O., Chen, K. and Sun, G. A general boosting method and its application to learning ranking functions for web search. In Advances in Neural Information Processing Systems 20, pp. 1697-1704. MIT Press, 2008.

Zhou, Ding, Bolelli, Levent, Li, Jia, Giles, C. Lee and Zha, Hongyuan. Learning user clicks in web search. In International Joint Conference on Artificial Intelligence (IJCAI07), 2007.

\* cited by examiner

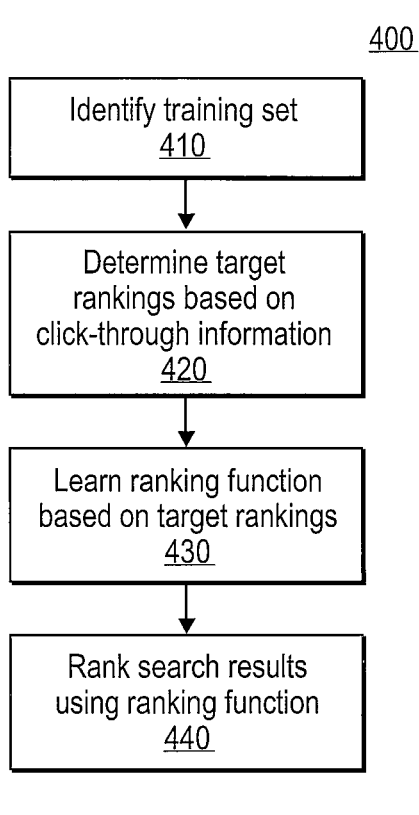
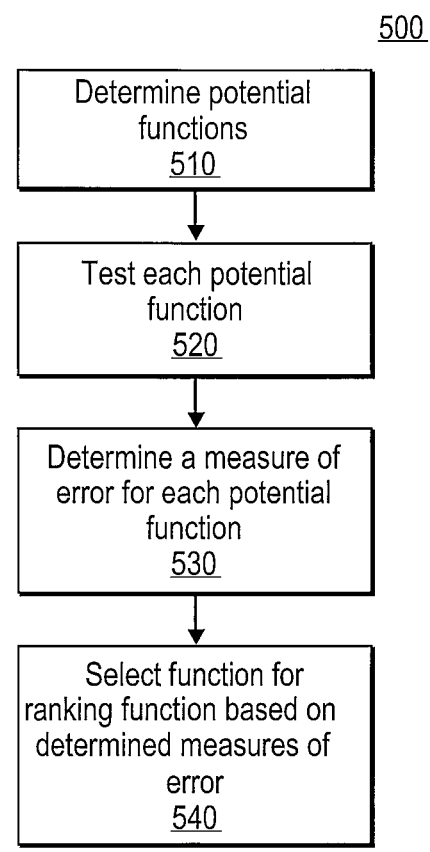
FIG. 4
FIG. 5

CLICK MODEL FOR SEARCH RANKINGS

FIELD OF THE INVENTION

Embodiments of the invention described herein relate generally to search rankings, and, more specifically, to techniques for ranking items in search results based on information in click logs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search providers, such as Yahoo, Inc., provide search results to users in response to queries submitted by those users. Because search results may indicate hundreds or thousands of matching documents—i.e. "hits"—for a given query, it is usually helpful to sort those documents by relevance to the query. One technique for sorting documents is to rank the documents according to relevance scores calculated for each document. Search results that have been sorted in this fashion are hereinafter described as "ranked search results."

One problem with generating ranked search results is that it is difficult to determine meaningful relevance scores for each document indicated by the search results. One approach for determining relevance scores relies on human editorial judgments. For example, the search provider may ask a person or group of persons to determine relevance scores for various documents matching a particular query. Unfortunately, obtaining human editorial judgments for every possible hit for every possible query that may be submitted to a search engine is prohibitively expensive, particularly as documents are continuously modified and/or added to a search repository. Moreover, human editorial judgments are prone to well-known errors and biases.

Some approaches for generating relevance scores rely on a ranking function (also known as a relevance function) instead of or in addition to human editorial judgments. Generally speaking, a ranking function accepts a document and/or features thereof as input. A feature is a quantification of an aspect of a document or of the relationship of a document to a query. Given a document and, in some cases, a query, a feature returns a value. Example input features may include, for example, the number of times a search term from a query appears in a document, the location in which the search terms appear in that document, the proximity of one search term to another in a document, a likelihood that the document is "spam," term weights, the URL depth of the document, the source of the document, the authority of the document, and so on. Based on this input, the ranking function calculates a relevance score.

Because ranking functions may rely on tens or hundreds of input features, it is difficult to determine ranking functions that reliably approximate relevance, especially as relevance changes over time. One proposed solution for increasing the effectiveness and adaptability of a ranking function is to utilize click-through information to generate features for the relevance function. Click-through information indicates, for a particular query, which documents indicated in search results for that particular query were accessed by users who issued the particular query (i.e. which documents users "clicked" on). In essence, the solution teaches that one may calculate a relevance score for a document to a query based, in part, on the click-through information available for that particular document. Such a technique is described in U.S. Patent Publication 2007/0255689 A1, by Sun et al., published on Nov. 1, 2007 and entitled "System and method for indexing web content using click-through features," the entire contents of which are hereby incorporated by reference for all purposes as if fully set forth herein.

However, even utilizing click-through information, ranking functions are often unable to approximate the effectiveness of human editorial judgments in producing relevance scores. This ineffectiveness is due, in part, to problems in existing models for predicting relevance based on click-through information—particularly the well-known problem of positional bias. Positional bias, in short, refers to the tendency of users to pay attention to highly positioned documents in a set of search results while ignoring other documents in that set of search results, even though the other documents may be more relevant than the highly-positioned documents. The difficulty of overcoming this problem is discussed in, for example, N. Craswell, et al., "An experimental comparison of click position-bias models," in *Proceedings of the international conference on web search and web data mining*, pages 87-94, ACM 2008, the entire contents of which are hereby incorporated by reference for all purposes as if fully set forth herein.

Many approaches for generating relevance scores rely on a "learned" ranking function. Rather than utilizing a static, human-determined ranking function, one may configure a search system to "learn" a ranking function using various machine learning techniques. Using the same machine learning techniques, one may continuously adapt the ranking function as time goes on. Generally speaking, these techniques involve training the search system what constitutes relevance by giving the search system various training sets of documents for which rankings are already known. For example, rankings may be known for a training set because the search provider has collected editorial judgments of the relevance of each of the documents in the training set to their associated query. The search system then uses a classifier, such as a neural network or decision tree, to iteratively refine a function of document features. The result of this process is a ranking function whose calculated relevance scores maximize the likelihood of producing the "target" rankings—i.e. the known rankings for each of the training sets of documents. This ranking function may then be used to compute relevance scores for documents whose relevance scores are not known.

Techniques for learning a ranking or relevance function are described in, for example, C. Burges, et al., "Learning to rank using gradient descent" in *Proceedings of the 22nd international conference on Machine learning*, pages 89-96, 2005; Z. Zheng, et al., "A general boosting method and its application to learning ranking functions for web search." in *Advances in Neural Information Processing Systems* 20, pages 1697-1704, MIT Press 2008; U.S. Pat. No. 7,197,497 to Cossok, et al., entitled "Method and apparatus for machine learning a document relevance function" and issued Mar. 27, 2007; and U.S. patent application Ser. No. 11/863,453 by Olivier Chapelle, filed Sep. 28, 2007, and entitled "Gradient Based Optimization of a Ranking Measure," the entire contents of each of which are hereby incorporated by reference for all purposes as if fully set forth herein.

However, learned ranking functions still often yield unsatisfactory results. This problem results from, among other factors, imperfections in the known rankings (for example, human errors and biases) and limitations on the size and number of training sets available. Furthermore, while learned ranking functions typically only require human editorial judgments for a small portion of queries and documents, learned ranking functions still typically require editorial judgments, which can be difficult and expensive to obtain.

It is therefore desirable to provide more efficient techniques for generating a ranking function. It is furthermore desirable to provide more efficient techniques for determining the relevance of a document to a particular query. It is furthermore desirable to overcome the problems of positional bias when utilizing click log information to model relevance.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow chart illustrating exemplary steps for using click-through information while learning a ranking function, according to an embodiment of the invention;

FIG. 5 is a flow chart illustrating exemplary steps for learning a ranking function, according to an embodiment of the invention;

DETAILED DESCRIPTION

Figure 1:
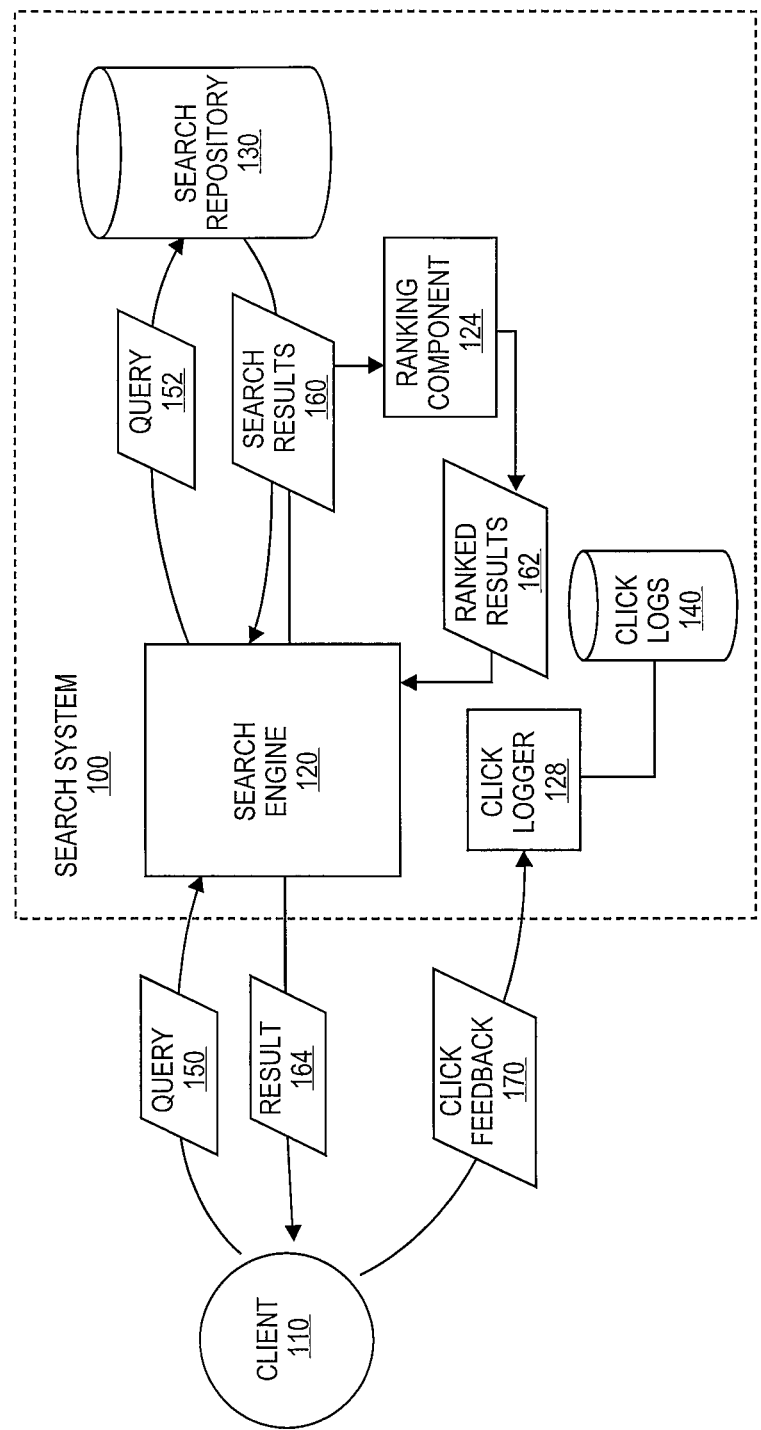
FIG. 1 is a block diagram illustrating the components of an exemplary query session, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
   2.1. Query Session
   2.2. Components for Learning the Ranking Function
3.0. Functional Overview
   3.1. Determining Relevance based on Click-Through Information
   3.2. Using Click-Through Information to determine a Learning Target
   3.3. Learning a Ranking Function
   3.4. Using Human Editorial Judgments with Click-Through Data
4.0. Implementation Examples
   4.1. Dyanamic Bayesian Network for Determining Relevance
   4.2. Estimating Model Parameters Using Expectation Maximization
   4.3. Computing Confidence for Latent Variables
   4.4. Variations
5.0. Implementation Mechanism-Hardware Overview
6.0. Extensions and Alternatives 1.0. General Overview Approaches, techniques, and mechanisms are disclosed for learning ranking functions and relevance scores based on information in click logs. According to an embodiment, click-through data may be utilized to calculate measures of relevance between a document and a query in a manner that significantly reduces or eliminates the effect of positional bias. Conventional approaches teach only that one may calculate the relevance of document to a query based on click-through information about that particular document. According to an embodiment of the invention, when calculating a relevance score for a particular document, one may also utilize click-through information about other documents previously returned in the same search results as the particular document. Specifically, one may make a number of inferences about a particular document based on the knowledge of whether or not, in a particular search session, documents other than the particular document were accessed. For example, based on this knowledge, one may infer whether or not a user examined information about the particular document, such as a URL, abstract, or title for the document. One may also infer whether or not, based on the information about the document, the user perceived the document as being relevant and therefore accessed the document. One may further infer whether or not the user, having accessed the particular document, was actually satisfied by the document (i.e. found the document to be actually relevant to the query). Furthermore, based on click-through information for multiple search sessions, one may infer overall probabilities that a document will be selected for access in response to a query and that a user's query will be satisfied by a given document given that the user has selected the given document for access. Using any or all of these and/or other inferences based on the click-through information, one may determine a relevance score for the particular document. This relevance score may then be used as targets or features for a ranking function.

According to an embodiment, one may utilize a model to calculate relevance scores from click-through information. One may simultaneously model the relevance of all documents in a set of documents. Click-through information for multiple search sessions is fed as input to the model. For each session, the model further comprises unobserved latent variables representing whether or not a user examined information about a document, accessed the document, and/or found the document actually relevant. Based on the input and the modeled variables, one may further model an overall probability that a document will be selected for access in response to a query, absent positional bias, as well as an overall probability that a user's query will be satisfied by a given document given that the user has selected the given document for access. A relevance score may be calculated from this model by estimating values for the overall probabilities. One may accomplish this estimation using optimization techniques, such as gradient descent, or maximum likelihood techniques, such as expectation-maximization (hereinafter "EM"). According to an embodiment, the model is a Dynamic Bayesian Network (hereinafter "DBN").

According to an embodiment of the invention, instead of (or in addition to) utilizing click-through information to generate features for a ranking function, one may utilize click-through information to generate ranking function targets for machine learning purposes. Training sets of documents may be selected for learning the ranking function based on the availability of click-through information. The click-through information may be utilized to determine target rankings for the documents in the training set. The ranking function may then be learned by finding a ranking function that maximizes the likelihood of producing those target rankings. In this manner, a ranking function may be learned more efficiently, based on readily-available data mined from, for example, a click log, instead of (or in addition to) human provided scores.

In other aspects, the invention encompasses a computer apparatus and a computer-readable medium configured to carry out the foregoing steps.

2.0. Structural Overview 2.1. Query Session

FIG. 1 is a block diagram illustrating the components of an exemplary query session, according to an embodiment of the invention.

A user at client 110 initiates the query session by sending a query 150 to a search engine 120. Query 150 is comprised of one or more terms. Client 110 may be, for example, a computer system connected to search engine 120 via a network, such as the Internet. The user may submit query 150 via an application executing on client 110, such as a web browser. Search engine 120 is a component of a search system 100. Components of search system 100 may be implemented, for example, using one or more servers, databases, and/or other hardware.

In response to receiving query 150, search engine 120 performs a search against a search repository 130 based on a query 152. Query 152 may be identical to or based on query 150. Search repository 130 may be, for example, a database storing data that describe a large number of documents. Data that describe a document may include, for example, a Uniform Resource Locator (URL), such as an HTTP address, that describes the location of the document, content contained within the document, and/or metadata describing various attributes of the document.

In response to performing the search against search repository 130, search engine 120 obtains search results 160 from search repository 130. Search results 160 are data indicating matching documents for query 152 (and, by extension, the user's query 150). Search results 160 may include any or all of a URL, content, and/or metadata for each indicated document.

In response to obtaining search results 160, search engine 120 feeds search results 160 to a ranking component 124. Ranking component 124 may be part of search engine 120, or a separate component of search system 100. Ranking component 124 utilizes a ranking function to sort the documents indicated in search results 160. Ranking component 124 then returns ranked results 162 to search engine 120. Ranked results 162 indicate the order in which the documents have been sorted.

Based on ranked results 162, search engine 120 generates results 164. Search engine 120 then sends results 164 to client 110. Results 164 comprise data describing some or all of the documents indicated by search results 160. The data may include, for example, metadata for each document. The metadata may be metadata that was returned from the search repository 130 in search results 160, or other metadata generated or collected by search engine 120. The metadata may include, for example, a title, an abstract, and the URL. Search engine 120 may communicate results 164 to client 110 in a variety of formats capable of being understood by client 110, such as one or more web pages.

With each indicated document, results 164 may include, for example, one or more links or other controls that allow a user to select the document for access. Or, client 110 may generate such controls based on, for example, the indicated URL for the document. In response to the user selecting a control for a document and thereby indicating that the user has selected to access the document—for instance, in response to the user clicking on a link for the document with their mouse—client 110 may locate and present the indicated document to the user.

Further in response to a user selecting a document, client 110 sends click feedback 170 to a click logger 128. Click logger 128 may be a component of search engine 120, or a separate component of search system 100. Click feedback 170 comprises, among other data, data indicating the document selected by the user. Client 110, or an application running thereon, may be configured to capture user behavior with respect to query results and generate data for click feedback 170 accordingly. For example, results 162 may have included code, such as JavaScript, that causes client 110 to generate and send click feedback 170 when a user clicks on a link.

Click logger may generate click logs 140 based on the received click feedback 170. Click logs 140 may, for example, be stored as files or database entries in search system 100.

A search system 100 may be involved in many overlapping or concurrent query sessions with many different clients 110, each query session corresponding to a different query 150 and yielding different results 164. Moreover, the same query 150 may be submitted multiple times by the same or different users in different query sessions. Results 164 for query 150 may differ in each of these query sessions, owing to factors such as additions and changes to the documents in search repository 130, as well as variability in the ranking function used to generate ranked search results 162.

2.2. Components for Learning the Ranking Function

Figure 2:
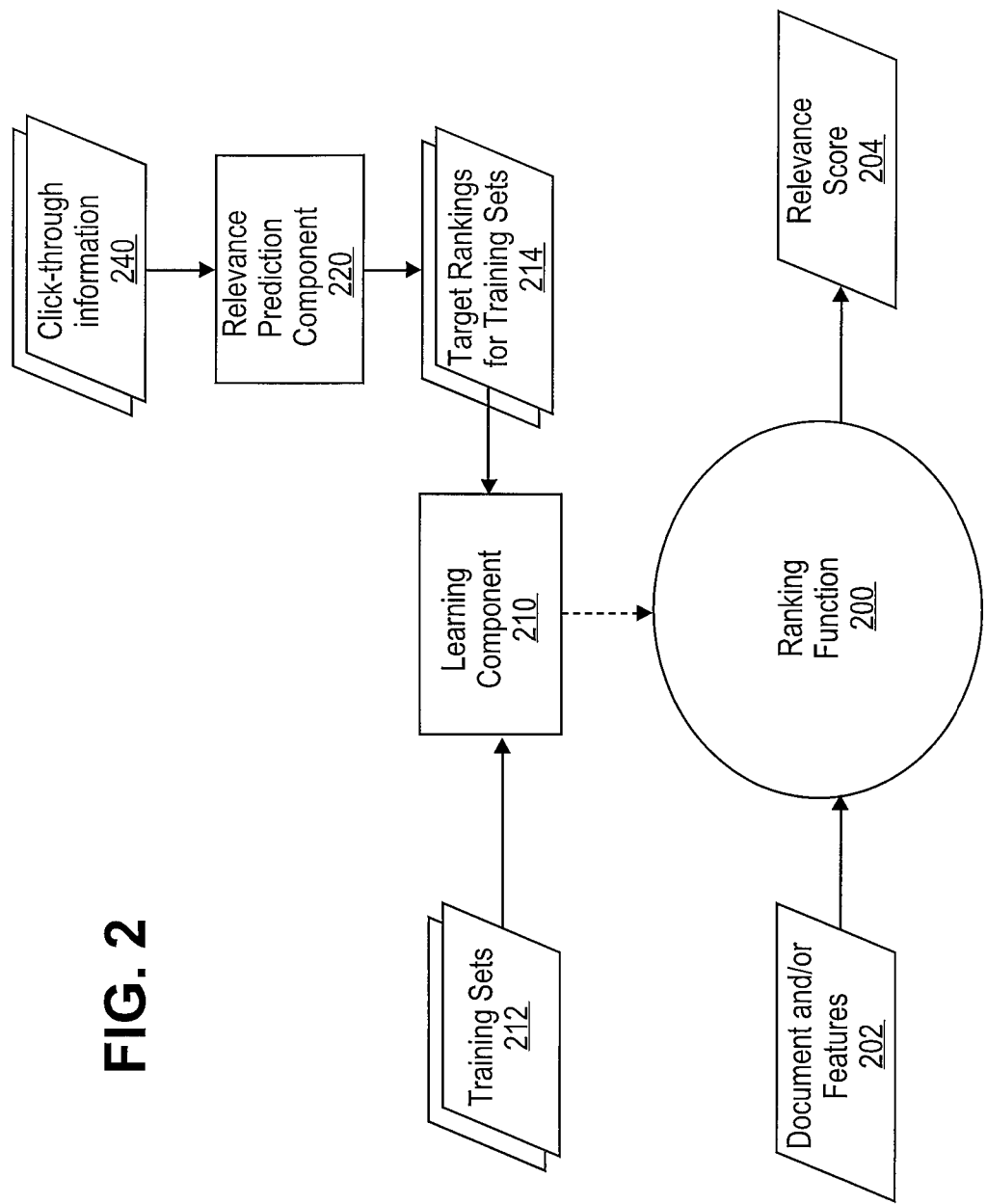
FIG. 2 is a block diagram illustrating various components involved in the generating a ranking function, according to an embodiment of the invention.

FIG. 2 is a block diagram illustrating various components involved in the generating a ranking function 200, according to an embodiment of the invention. Ranking component 124 utilizes ranking function 200 to generate a ranked search result. With ranking function 200, ranking component 124 calculates relevance scores for documents in a particular search result for a particular query. Based on the calculated relevance scores, ranking component 124 sorts the documents in a search result so as to produce a ranked search result, such as ranked search result 162.

According to an embodiment, ranking component 124 utilizes the same ranking function 200 for all search results, regardless of the particular query in response to which a particular set of search results was generated. In other embodiments, ranking component 124 may utilize different ranking functions for different queries or groups of queries.

Ranking function 200 accepts, as input, a document 202 and/or features thereof. Document 202 may be, for example, an item in search result 160. Based on this input, ranking function 200 calculates a relevance score 204 for document 202. Relevance score 204 may be, for example, a number or other enumerated value.

Ranking function 200 is a learned function, in that search system 100 or a component thereof has generated ranking function 200 utilizing various machine learning techniques. In fact, search system 100 may periodically re-generate ranking function 200. For example, search system 100 may adjust ranking function 200 daily or weekly so that ranking function 200 may be re-learned from more recent data.

Ranking function 200 is generated by a learning component 210. Learning component 210 utilizes training sets 212 and training rankings 214 to determine ranking function 200. Each of training sets 212 pertains to a different query and comprises data indicating documents that have previously been returned for that query. The documents selected for a training set 212 may be a sampling of documents that have previously been returned for that query. The sample may be, for example, selected randomly, selected based on the position of the documents in the previously returned search results, selected based on the availability of click-through information for the selected documents, and/or selected so as to obtain a diverse sample with respect to one or more content, query, or click-dependent features. In some embodiments, the documents may include all documents that have previously been returned for that query. The queries for which training sets 212 are selected may be, for example, selected randomly, selected based on query popularity, selected based on the availability of click-through information, selected so as to obtain a diversity of queries with respect to query features or training set sizes, and/or decided upon by an administrator of the search system.

Training rankings 214 may be data indicating relevance for documents in training sets 212, with respect to particular queries. According to an embodiment, training rankings 214 may be scores indicating a relevance measure for each document in training sets 212 to one or more queries. According to an embodiment, training rankings 214 may comprise ordered lists of documents, such as pair-wise preferences of one document over another document, indicating the relevance of each document in the ordered list to a particular query, relative to the relevance of each other document in the ordered list to that same query.

Relevance prediction component 220 calculates training rankings 214 based on click-through information 240. Click-through information 240 may be, for example, data collected in response to previous query sessions and stored in click logs, such as click logs 140.

Click-through information 240 comprises data pertaining to the one or more queries. For each of those queries, click-through information 240 may indicate session information for one or more previous query sessions involving the query. For each query session, the session information indicates documents that were returned in the search results for that query session, as well as the order in which those documents were presented (i.e. the position of each document in the ranked search results). According to an embodiment, some or all of the session information is instead maintained separately from click-through information 240.

Click-through information 240 further comprises data indicating, for each of the query sessions indicated by the query information, which documents (if any) were selected for access by the user who initiated the query session. For example, click-through information 240 may comprise data indicating the selected documents directly. Or, click-through information 240 may comprise data indicating which positions were selected during said session, from which data the selected document may be deduced.

Click-through information 240 therefore indicates, either directly or by deduction, for each query session in a plurality of query sessions, for each query that has a corresponding training set 212, for each document indicated by search results for the query, whether or not a user selected the document. Relevance prediction component 220 may therefore utilize click-through information 240 to produce training rankings 214 for documents in training sets 212. For example, relevance prediction component may use various query-dependent click-through features, such as a click-through ratio, to weight each of the documents in training sets 212. As another example, relevance prediction component 220 may utilize techniques such as those described in section 3.1 of this application to determine relevance based on click-through information.

According to an embodiment of the invention, some or all of the functions of learning component 210 and relevance prediction component 240 may be implemented by a search engine, such as search engine 120, and/or other components of a search system, such as search system 100.

In generating ranking function 200, learning component 210 may utilize any known technique for deriving a function based on sample input (i.e. training sets 212) and known outputs for those sample inputs (training rankings 214), including, for example, regression analysis. According to an embodiment, learning component 210 utilizes machine learning techniques, including one or more classifiers such as a Neural Network, Support Vector Machine, Nearest Neighbor method, Gaussian or Gaussian Mixture Model, Bayes model, Decision Tree, Boosting, and a Radial Basis Function, as well as the techniques described in section 3.3. The documents in training sets 212 (or features thereof) may be utilized as features for these machine learning techniques, while training rankings 214 may be utilized as targets.

According to an embodiment, learning component 210 may further utilize one or more validation sets of documents, and training rankings may be calculated for the validation sets. A learned ranking function may be evaluated on a validation set so as to calculate the accuracy of the learned ranking function.

According to an embodiment, learning component 210 only requires a single training set 212 for a single query to learn ranking function 200. In such an embodiment, ranking function may be fine-tuned to that single query or a group of similar queries.

3.0. Functional Overview 3.1. Determining Relevance Based on Click-Through Information According to an embodiment of the invention, one may compensate for positional bias in click-through data for a search session by considering not only click-through information for a document, but also click-through information of documents positioned above or below that document in the set of search results for that session. In other words, one infers relevance from click-through information for a set of search results as a whole instead of individual documents in isolation. Thus, in evaluating the significance of a click for a document (or absence thereof) in response to a query, one may take into account the impact of both the position of that document and the perceived relevance of other documents in the set of search results for that query.

For instance, a set of search results for a particular query may have returned data indicating a relevant document in position 3. If the documents in positions 1 and 2 are very relevant, it is likely that the document in position 3 will have very few clicks, even though it is relevant. On the other hand, if the two top documents are irrelevant, then the document in position 3 will have many clicks. Thus, knowledge of which documents are positioned above the document in position 3 allows one to determine the true impact of position on the document in position 3. By contrast, a click model depending only on position and click-through rates for the document at position 3 would not be able to make the distinction between these two cases.

Figure 3:
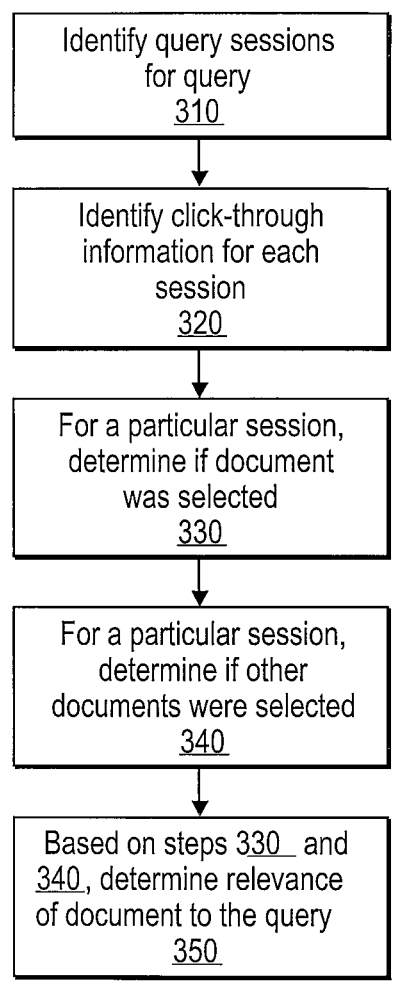
FIG. 3 is a flow chart illustrating an exemplary method for determining the relevance of a document to a query, based on click-through information collected from previous query sessions involving that query, according to an embodiment of the invention.

FIG. 3 is a flow chart 300 illustrating an exemplary method for determining the relevance of a document to a query, based on click-through information collected from previous query sessions involving that query, according to an embodiment of the invention.

At step 310, a plurality of query sessions in which the query (or a sufficiently similar query) was submitted is identified. For each session in the plurality of query sessions, the session information comprises data indicating an ordered list of documents, wherein the ordered list of documents was indicated in the search results for that session. This identification may occur, for example, based on session information collected by search system 100 and stored in various logs or historical databases, including click logs 140. For example, each time search system 100 responds to the query, search system 100 may store data indicating the query and the ordered search results provided in response to the query.

According to an embodiment, the session information may identify a different set of search results for each query session. According to another embodiment, the session information may identify a common set of search results for one or more of the query sessions.

At step 320, for each session in the plurality of query sessions, click-through information associated with the session is identified. The click-through information comprises data indicating one or more documents that were selected for viewing by the user associated with that session (e.g. the user who issued the query). Such information may be identified, for example, based on click-through information collected by search system 100 from click feedback 170 for that session. For example, as search system 100 processes click feedback 170 during a particular session, search system 100 may store data based on that feedback in association with the session information indicating that session.

At step 330, for each session in the plurality of sessions, based on the click-through information associated with that session, it is determined whether or not, during the session, the user associated with that session selected the document for which the relevance determination is sought.

At step 340, for each session in the plurality of sessions, based on the click-through information associated with that session, it is determined whether or not, during the session, the user associated with that session selected other documents indicated by the search results for that session.

At step 350, a relevance score is calculated based on the determinations of steps 330 and 340. The score represents a probability that a given user will find the document relevant to the particular query.

A variety of techniques are possible for performing the estimation of step 350. For example, for at least some of the considered sessions, one may infer from the above determinations a probability that the document is actually relevant. One may then aggregate, average, or otherwise utilize these probabilities over all of the sessions to determine an overall relevance score for the document. As another example, one may utilize the EM algorithm depicted in FIG. 7 and described in section 4.2. Other techniques are discussed below and in sections 3.1, 4.1, 4.2, 4.3, and 4.4.

Once a relevance score has been learned, it may then be utilized for a wide variety of purposes. For example, it may used as a feature or target of a ranking function.

Inferences Based on Click Data for a Session

According to an embodiment of the invention, based on a determination that a user has clicked on a particular document, one may infer perceived relevance for that document—i.e. that a user perceives a document to be relevant to his or her query. In other words, one may infer that the user examined the title, abstract, or other metadata for the document and found the metadata "attractive" enough that the user selected the document for access.

According to an embodiment of the invention, based on a determination that a user has clicked on one or more documents positioned after a document, one may infer a probability that the user has examined the title, abstract, or other metadata for the document. In other words, if a user has selected a search result document indicated at position 4 for access, one may infer that it is highly likely that the user examined metadata for each of documents 1, 2, and 3.

According to an embodiment, based on an inference that a document has been examined, one may infer whether or not the absence of a click for that document indicates that the document is not perceived to be relevant. In other words, the lack of a click at position 3 in combination with a click at position 4 indicates that it is likely that the user examined metadata for the document at position 3 and perceived the document at position 3 to not be relevant. On the other hand, the lack of a click at position 5 does not necessarily indicate that the user did not perceive the document at position 5 to be relevant, because the user likely did not examine metadata about the document at position 5.

According to an embodiment of the invention, based on a determination that a document has been clicked on, and further based on a determination that one or more documents positioned after that document have or have not been clicked on, one may further infer a likelihood that a document is actually relevant (as opposed to perceived relevant) to a query—i.e. that the document has "satisfied" the query. For example, if a document in position 3 has been clicked on, but the document in position 4 has also been clicked on, one may assume that a user accessed the document in position 3, found it not actually relevant, and then selected new document. By contrast, if no document besides the document in position 3 was selected, one may assume that the user either found the document at position 3 actually relevant to the query, or that the user found the document not relevant and gave up on the query altogether.

According to an embodiment, one may infer a likelihood that a document positioned after the last-clicked position in a session was examined. The likelihood may be based on, for example, a persistence parameter or function, indicating the likelihood that a user will give up on a query without finding an actually relevant document. This persistence parameter or function may be generic, defined for all users of the search system, query-dependent, document-dependent, and/or user dependent. One may also base inferences regarding actual relevance on this persistence parameter.

According to an embodiment, one may make a variety of other inferences about the relevance of a particular document to a particular query based on determination of which documents in a session have been clicked on.

Extending Session-Based Inferences to Overall Relevance

According to an embodiment, based on an inference (or lack thereof) of perceived relevance over a plurality of sessions for the query, one may calculate an overall probability of perceived relevance—i.e. that a given user will perceive the document to be relevant to the query. A relevance score may be calculated based on this overall probability.

According to an embodiment, using some or all of the inferences described in the section above, one may determine a probability, for at least some sessions, that a user found a document actually relevant to a query. One may calculate an overall probability of satisfaction—i.e. that a given user will find a particular document actually relevant to a particular query given that the given user has selected the particular document—based on the average of these probabilities for the sessions where such a probability is determinable. In essence, the probability of satisfaction may be understood as a ratio between actual and perceived relevance. A relevance score may also be calculated based on this overall probability.

According to an embodiment, using some or all of the inferences described in the section above, one may calculate, for at least some sessions, both an overall probability of perceived relevance and an overall probability of satisfaction. A relevance score may be calculated based on a function of both of these overall probabilities. According to an embodiment, the relevance score is the product of the probability of perceived relevance and the probability of satisfaction.

According to an embodiment, some or all of the inferences and/or overall probabilities discussed above may be modeled as latent variables. The latent variables may be modeled as functions of the click-through information available for the sessions. For example, the latent variables may be functions of binary variables that indicate, for each position i, in each set of session search results, whether or not the user clicked on the document at position i. A best fit for model may then be solved using a variety of techniques, including expectation maximization and gradient descent. A relevance score may then be calculated based on one or more of the modeled overall probabilities.

3.2. Using Click-Through Information to Determine a Learning Target

FIG. 4 is a flow chart 400 illustrating exemplary steps for using click-through information while learning a ranking function, such as ranking function 200, according to an embodiment of the invention. Though the steps of FIG. 4 are described herein as being performed generically by a search system, the steps may be performed by any component of a search system.

At step 410, a search system identifies a training set of documents, such as one of training sets 212. The training set of documents is associated with a query, in that each document in the training set was returned as a search result for that query. The search system stores click-through information, such as click-through information 240, for the query. The click-through information indicates, for each particular query session in a plurality of query sessions, whether or not a user selected one or more documents indicated by search results for the particular query session.

At step 420, the search system determines target rankings, such as target rankings 214, for the training set of documents, based on the click-through information. The target rankings may be, for example, relevance scores calculated for each document in the set of documents, using techniques such as those described in section 3.1. As another example, the target rankings may be ordered listings of documents, indicating the relevance of each document in an ordered list to a particular query, relative to the relevance of each other document in that ordered list to that same query. Such ordered listings may be derived, for example, from relevance scores.

At step 430, using at least the target rankings as a target, the search system learns a ranking function based on at least features of the set of documents. For example, the search system may derive a feature vector for each document in the training set and learn a function of those feature vectors that approximately predicts the target rankings. Learning the ranking function may be accomplished, for example, by any of the techniques mentioned in the previous section as being relied upon by learning component 210. The search system may also rely upon features from other training sets related to other queries with other target rankings when learning the ranking function.

At step 440, the search system ranks one or more search results based on the ranking function. For example, the search system may receive a user query from a user. The user query may be any query, not necessarily a query relied upon for learning the ranking function. The search system may determine search results for the user query. The search system may rank the search results using the ranking function, thereby generating data indicating an ordered list of the documents indicated by the search results. The ranked search results may be reported to the user.

3.3. Learning a Ranking Function

FIG. 5 is a flow chart 500 illustrating exemplary steps for learning a ranking function, such as ranking function 200, according to an embodiment of the invention. Though the steps of FIG. 5 may be performed by any component of a search system, the steps of FIG. 3 are discussed below in the context of learning component 210.

At step 510, learning component 210 determines a plurality of functions that, given values for features of a particular document, output a relevance score for the particular document. For example, learning component 210 may iteratively refine a function until a satisfactory ranking function is determined. Or, learning component 210 may feature logic for generating various alternative functions from which the ranking function may be selected.

At step 520, learning component 210 tests each particular function of the plurality of functions by using the particular function to determine predicted rankings for each inputted set of documents. The predicted rankings are based on the relevance scores calculated by that particular function.

At step 530, learning component 210 generates a measure of error for each particular function based on discrepancies between target rankings, such as target rankings 214, and the predicted rankings. Generally speaking, the measure of error estimates the quality of a tested function. The measure of error may, for example, represent the risk, approximate risk, empirical risk, or generalization error associated with using the function. The measure of error may be calculated using, for example, a loss, error, or objective function based on the target rankings and the predicted rankings.

At step 540, learning component 210 selects, as the ranking function, one of the functions from said plurality of functions, based on the measures of error. For example, learning component 210 may select the function whose measure of error indicates the least discrepancy between the target rankings and the predicted rankings. Or, for example, learning component 210 may select a function with minimal error or risk.

Steps 510-540 need not occur in the above order. For example, according to some embodiments, learning component 210 may generate a function, test that function, calculate a measure of error, generate another function, test that function, calculate another measure of error, and so on, until a ranking function is selected in step 540. In such embodiments, step 540 occurs in response to a triggering event, such as the occurrence of a certain number of iterations of function refinement, identification of a function whose measure of error crosses some threshold value, or determination that the measure of error has remained approximately the same over a certain number of recent iterations.

3.4. Using Human Editorial Judgments with Click-Through Data

According to an embodiment, learning component 210 may further utilize human editorial judgments in the form of editorial rankings for some or all of training sets 212. For example, editorial rankings may be used interchangeably with training rankings 214 based on click-through data, depending on the availability of the underlying click-through data and/or human editorial judgments. As another example, a measure of error may also be based on discrepancies between the editorial rankings and the predicted rankings.

For example, learning component 210 may utilize a gradient boosted decision trees framework. The boosting algorithm of the framework may optimize an objective function, such as Equation (1), where $P_E$ represents the editorial rankings, $P_C$ represents training rankings 214, f is the potential ranking function to be tested, and $\gamma$ is the weight to assign to the training rankings 214. Both rankings comprise pairwise preferences in the form $(x_i, x_j)$, indicating that a feature vector $x_i$ for a document i is preferred to a feature vector $x_j$ for a document j.

$$\frac{1-\gamma}{|P_E|} \sum_{(x_i,x_j) \in P_E} \max(0, 1 - (f(x_i) - (f(x_j)))^2 +$$

$$\frac{\gamma}{|P_C|} \sum_{(x_i,x_j) \in P_C} \max(0, 1 - (f(x_i) - f(x_j)))^2$$

Equation (1)

Figure 6:
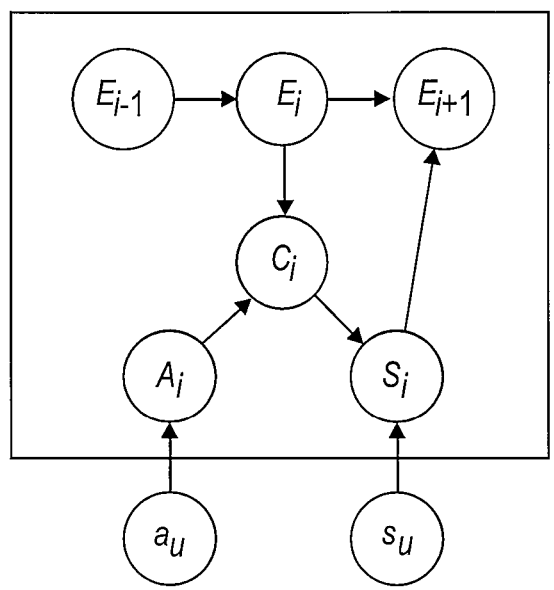
FIG. 6 illustrates an exemplary Dynamic Bayesian Network (hereinafter "DBN") model for determining the relevance of a particular document to a particular query, according to an embodiment of the invention.

4.0. Implementation Examples
4.1. Dynamic Bayesian Network for Determining Relevance FIG. 6 illustrates an exemplary Dynamic Bayesian Network (hereinafter "DBN") model for determining the relevance of a particular document to a particular query, according to an embodiment of the invention. The DBN, as depicted, models the following variables and probabilities: $s_u$ is the probability that a given user will find the particular document actually relevant to the particular query given that the given user has selected the particular document (the probability of satisfaction); $a_u$ is the probability that the particular document will be selected in response to the particular query (the probability of perceived relevance); $E_i$ is a latent variable indicating whether or not the user associated with the session examined information about the document at the position i; $A_i$ is a latent variable indicating whether or not the user associated with the session accessed the document at the position i; $S_i$ is a latent variable indicating whether or not the user associated with the session, having examined the document, found the document at the position i relevant to the particular query; 1-$\gamma$ is the probability that a given user will end a given query session without finding a document that is relevant to the particular query; and $C_i$ is, for each session in the plurality of sessions, for each position i of a document in the ordered list of documents, a known variable, based on the click-through information, indicating whether or not it has been determined that document at position i was selected.

The variables inside the box of FIG. 6 are defined at the session level, while those out of the box are defined at the query level. The model is described by Equations (2a)-(2g) below:

$$A_i=1, E_i=1 \Leftrightarrow C_i=1$$ Equation (2a)

$$P(A_i=1)=a_u$$ Equation (2b)

$$E_i=0 \Rightarrow E_{i+1}=0$$ Equation (2c)

$$S_i=1 \Rightarrow E_{i+1}=0$$ Equation (2d)

$$P(S_i=1|C_i=1)=s_u$$ Equation (2e)

$$C_i=0 \Rightarrow S_i=0$$ Equation (2f)

$$P(E_{i+1}=1|E_i=1; S_i=0)=\gamma$$ Equation (2g)

According to an embodiment, each of the variables $A_i$, $E_i$, $S_i$, and $C_i$ are binary. According to other embodiments, some or all of the variables $A_i$, $E_i$, $S_i$, and $C_i$ may be continuous between 0 and 1 to represent degrees of uncertainty in the assumptions and inferences of the model. According to an embodiment, $a_u$ and $s_u$ each have a beta prior because the beta distribution of the model is conjugate to the binomial distribution.

According to an embodiment, the model above may be based on several assumptions. First, the model assumes that there is a click if and only if the user looked information about the document and was attracted to it (1a). Second, the model assumes that the probability of being attracted to a document depends only on the document (1b). Third, the model assumes that a user scans the ordered list of documents indicated by a search result linearly from top to bottom until he or she decides to stop. This implies Equation (1c): if the user did not examine the position i, he will not examine the subsequent positions. Fourth, the model assumes that once the user is satisfied by a document he or she accesses, the user stops the search (1d). Fifth, the model assumes that after a user clicks and visits a document, there is a certain probability that the user will be satisfied by the document (1e). On the other hand, if the user does not click, the user will not be satisfied (1f). Finally, the model assumes that even if the user is not satisfied by the current result, there is a probability 1-$\gamma$ that the user abandons his search (1g). In other words, $\gamma$ measures the perseverance of the user.

According to other embodiments, different assumptions may be made. These different assumptions may lead to slight variations in the model.

According to an embodiment, relevance may be determined for this model using Equation (3) below, where $r_u$ is the relevance of the document.

$$r_u := P(S_i=1|E_i=1) = P(S_i=1|C_i=1)P(C_i=1|E_i=1) = a_u s_u$$ Equation (3)

4.2. Estimating Model Parameters Using Expectation Maximization

According to an embodiment of the invention, one may use an EM algorithm for estimating the parameters $a_u$, $s_u$, and $\gamma$ of a model for determining relevance. One may then use the forward-backward algorithm to compute the posterior probabilities of the hidden variables.

An exemplary usage of the EM algorithm is described below. In this example, there are N sessions. The variables Aj, Sj, and Ej denote the vector of hidden variables associated with the $j^{th}$ session. The variable $d_j^i$ denotes the document in position i of the $j^{th}$ session. For simplicity, the example uses only the documents appearing in the first page of the search results, which means that the sequence goes from 1 to 10. However, the example could easily be modified to use more or less documents from the search results.

M Step

For the M step of the EM algorithm, one may define $a_u$ and $s_u$ as shown in Equations (4a) and (4b).

$$a_u = \frac{\alpha_a - 1 + \sum_{j=1}^{N} \sum_{i=1}^{10} I(d_i^j = u) Q(A_i^j = 1)}{\alpha_a + \beta_a - 2 + \sum_{j=1}^{N} \sum_{i=1}^{10} I(d_i^j = u)}$$ Equation (4a)

$$s_u = \frac{\alpha_s - 1 + \sum_{j=1}^{N} \sum_{i=1}^{10} I(d_i^j = u, C_i^j = 1) Q(S_i^j = 1)}{\alpha_s + \beta_s - 2 + \sum_{j=1}^{N} \sum_{i=1}^{10} I(d_i^j = u, C_i^j = 1)}$$ Equation (4b)

In the above equations: N is the number of sessions (for the query being considered); $\alpha_a$, $\beta_a$, $\alpha_s$, and $\beta_s$ are prior parameters to set; I is the binary indicator variable; $I(d_j^i=u)$ is 1 if the $i^{th}$ document of the $j^{th}$ session is u (0 otherwise); $I(d_j^i=u; C_j^i=1)$ is 1 if, in addition, there was a click on that document; and $Q(A_j^i=1)$ and $Q(S_j^i=1)$ are the posterior distributions computed during the E step.

More generally, one may define $a_u$ and $s_u$ as shown in Equations (5a) and (5b).

$$a_u = \operatorname*{argmax}_{a} \sum_{j=1}^{N} \sum_{i=1}^{10} I(d_i^j = u)(Q(A_i^j = 0)\log(1-a) + Q(A_i^j = 1)$$

$$\log(a)) + \log P(a)$$ Equation (5a)

$$s_u = \operatorname*{argmax}_{s} \sum_{j=1}^{N} \sum_{i=1}^{10} I(d_i^j = u, C_i^j = 1)$$

$$(Q(S_i^j = 0)\log(1-s) + Q(S_i^j = 1)\log(s)) + \log P(s)$$ Equation (5b)

In the above equations, P(a) and P(s) are the prior beta distributions. P(a) and P(s) may simply take a beta distribution with parameters (1,1), or these priors may be learned using a variational approximation. The maximizers may be easily computed in closed form.

Because of the priors, this EM algorithm does not converge to the maximum likelihood solution but to a mode of the posterior: it is a maximum a posteriori (MAP) solution.

E Step

For the E-Step of the algorithm, one may compute the posterior probabilities $Q(A_j^i)$, defined as $P(A_j^i|C^j, a_u, s_u, \gamma)$, and $Q(S_j^i)$, defined as $P(S_j^i|C^j, a_u, s_u, \gamma)$. In the rest of this section, for convenience, the conditioning on $a_u$, $s_u$, and $\gamma$ is assumed.

As in the forward-backward algorithm, one may define the variables $\alpha_i$, and, $\beta_i$ as shown in Equations (6a) and (6b). Note that $\alpha_i$ and $\beta_i$ are different variables than $\alpha_a$, $\beta_a$, $\alpha_s$, and $\beta_s$ from the M step.

$\alpha_i(e) = P(C_1^j, \ldots, C_{i-1}^j, E_i = e)$ Equation (6a)

$\beta_i(e) = P(C_i^j, \ldots, C_{10}^j | E_i = e)$ Equation (6b)

One may then loop over all sessions j=1 to N. For each session, one may perform the following four steps.

First, one may initialize $\alpha_1(0)=0$, $\alpha_1(1)=1$, $\beta_{11}(0)=1$, and $\beta_{11}(1)=1$. Second, one may calculate recursively, for i=1 to 10, the value for Equation (7a). Third, one may calculate recursively, for I=11 to 2, the value for Equation (7b).

$\alpha_{i+1}(e) = \Sigma_{e' \in \{0,1\}} \alpha_i(e') P(E_{i+1}=e, C_i|E_i=e')$ Equation (7a)

$\beta_{i-1}(e) = \Sigma_{e' \in \{0,1\}} \beta_i(e') P(E_i=e', C_{i-1}|E_{i-1}=e)$ Equation (7b)

In Equations (7a) and (7b), the conditional probabilities may be calculated as follows in Equation (8).

$$P(E_{i+1}, C_i | E_i) = \sum_{s \in \{0,1\}} P(E_{i+1} | S_i = s, E_i) P(S_i = s | C_i) P(C_i | E_i)$$ Equation (8)

The transition probabilities for Equations (7a) and (7b) are as follows in Equations (9a)-(9h), with u denoting the document in the $i^{th}$ position.

Equations (9a)-(9h)

$P(E_{i+1}=0, C_i=0|E_i=0)=1$ (a)

$P(E_{i+1}=1, C_i=0|E_i=0)=0$ (b)

$P(E_{i+1}=0, C_i=1|E_i=0)=0$ (c)

$P(E_{i+1}=1, C_i=1|E_i=0)=0$ (d)

$P(E_{i+1}=0, C_i=0|E_i=1)=(1-a_u)(1-\gamma)$ (e)

$P(E_{i+1}=1, C_i=0|E_i=1)=(1-a_u)\gamma$ (f)

$P(E_{i+1}=0, C_i=1|E_i=1)=a_u(1-\gamma+s_u\gamma)$ (g)

$P(E_{i+1}=1, C_i=1|E_i=1)=a_u\gamma(1-s_u)$ (h)

Fourth, one may define the posterior distribution as shown in Equations (10a) and (10b).

$$Q(A_i^j = 1) = \begin{cases} 1 & \text{if } C_i = 1 \\ a_u \alpha_i(0) \beta_i(0) / \beta_1(1) & \text{if } C_i = 0 \end{cases}$$ Equation (10a)

$$Q(S_i^j = 1) =$$ Equation (10b)

$$\begin{cases} \alpha_{i+1}(0)\beta_{i+1}(0)/\beta_1(1)/((1-\gamma)/s_a + \gamma) & \text{if } C_i = 1 \\ 0 & \text{if } C_i = 0 \end{cases}$$

Example EM Process Flow

Figure 7:
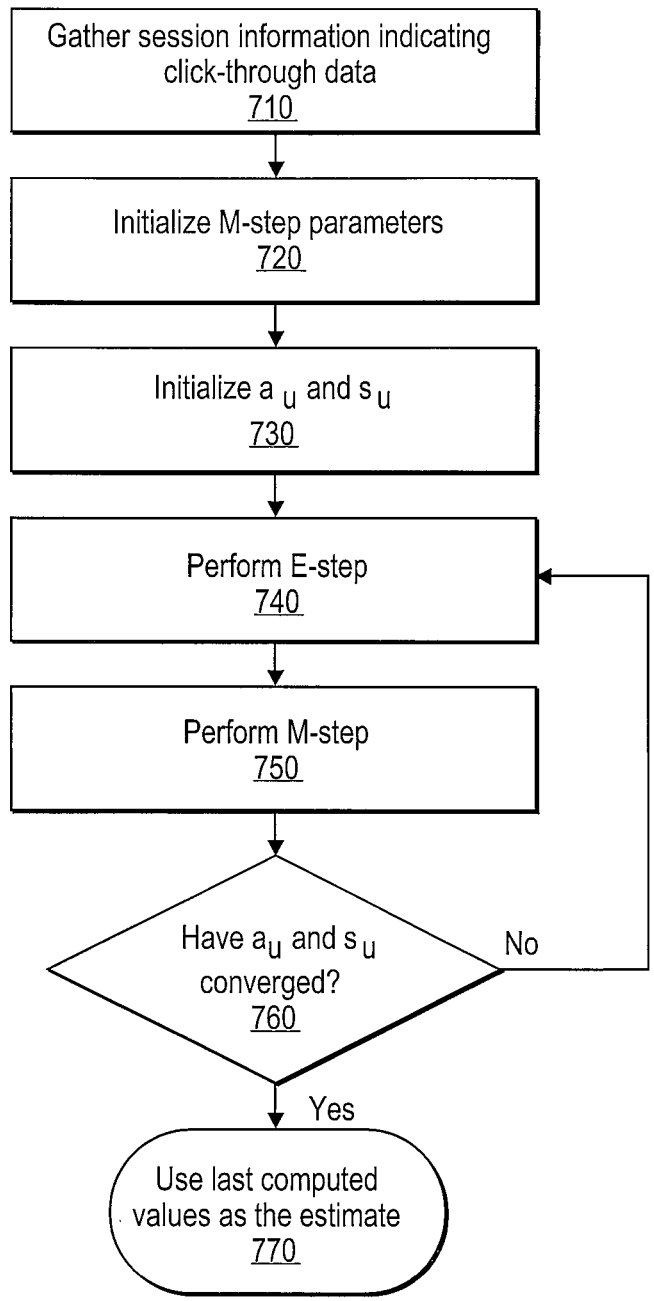
FIG. 7 illustrates a flow chart for estimating parameters of a model for determining relevance, according to an embodiment of the invention.

FIG. 7 illustrates a flow chart 700 for estimating parameters of a model for determining relevance, according to an embodiment of the invention. Some or all of the steps of flow chart 700 may, for example, be performed as part of step 350 in FIG. 3.

At step 710, session information indicating the click-through data $C_i$ is gathered. For example, session information may be gathered using steps 310-340 of FIG. 3.

At step 720, the M-step parameters $\alpha_a$, $\beta_a$, $\alpha_s$, and $\gamma$ are each set to initial values. For each of $\alpha_a$, $\beta_a$, $\alpha_s$, and $\beta_s$, any positive initial value may be chosen. For example, $\alpha_a$, $\beta_a$, $\alpha_s$, and $\beta_s$, may be each be set to 1. The parameter $\gamma$ may be set between 0 and 1. For example, $\gamma$ may be set to 0.05. Different contexts may call for different initial values, and one may easily experiment to find initial values that produce satisfactory results for a particular context.

At step 730, the parameters to be estimated, $a_u$ and $s_u$ are each set to initial values. For each of $a_u$ and $s_u$, any initial value between 0 and 1 may be chosen. For example, $a_u$ and $s_u$ could be initially set to 0.5. The value of $a_u$ and $s_u$ will converge upon a single value regardless of their starting value, thus the choice of an initial value does not affect the efficacy of the algorithm.

At step 740, the E-step may be performed by computing the Q distributions described above.

At step 750, the M-step may be performed by updating the values of $a_u$ and $s_u$ based on the Q distribution computations of the E-step.

At step 760, the values of $a_u$ and $s_u$ are checked for convergence. For example, it may be determined that $a_u$ and $s_u$ have converged if both values have remained relatively unchanged over the last n iterations of steps 740 and 750.

If, in step 760, it is determined that $a_u$ and $s_u$ have converged, then at step 770, the last-computed values $a_u$ and $s_u$ are said to have be the estimates for $a_u$ and $s_u$. Otherwise, steps 740 through 760 are performed iteratively until convergence is determined.

4.3. Computing Confidence for Latent Variables

According to an embodiment of the invention, one may further compute a measure of confidence in the relevance score determined for a document. For example, one may determine a measure of confidence to associate with the latent variables $a_u$ and $s_u$ calculated in the EM algorithm explained above.

This measure of confidence may be used, for example, in determining the degree to which one should rely on relevance scores computed from click-through information. As another example, the measure of confidence may be used as a weight during the training of the relevance function. As another example, the measure of confidence may be used to determine whether or not to select a particular training set of documents for use in learning a ranking function. For instance, if the measure of confidence in $a_u$ and $s_u$ for a particular training set of documents is below some threshold level, one may determine not to utilize the training set of documents for learning the ranking function.

One technique for deriving a confidence is to compute the second derivative of the log likelihood function at the MAP solution. This can be seen as doing a Laplace approximation of the posterior distribution. The second derivative turns out to have a simple expression because $P(C^j|a_u, s_u, \gamma) = \Sigma_{a,e,s} P(C^j|A^j=a^j, E^j=e^j)P(A^j=a, R^2=r^j, S^j=s^j|a_u, s_u, \gamma)$ is linear in $a_u$ and $s_u$.

The result is simply the average squared gradient, as shown in Equation (11). A similar equation will work for $s_u$.

$$\frac{\partial^2}{\partial a_u^2} \sum_{j=1}^{N} \log P(C^j | a_u, s_u, \gamma) = \sum_{j=1}^{N} \sum_{i=1}^{10} I(d_i^j = u) \left( \frac{Q(A_i^j = 1)}{a_u} - \frac{Q(A_i^j = 0)}{1 - a_u} \right)^2$$

Equation (11)

4.4. Variations

According to an embodiment, one may further calculate relevance based on inferences from click-through information indicating the time duration spent accessing a document.

According to an embodiment, one may infer, in certain circumstances, that there is some likelihood that a user may be satisfied even if the user does not click on a document (for example, the user might have found an answer to the query just by reading the abstract of the document).

According to an embodiment, the model for relevance may consider a non-linear examination of search results. For example, the exemplary DBN may model forward and backward jumps.

According to an embodiment, the $S_i$ variable may be continuous instead of binary: for informational queries, the user typically finds bits of information on each page and stops when his or her overall information need is fulfilled. Such a model may, for example, introduce a dependency between the $S_i$ variables.

Numerous other variations on the models, equations, techniques, and algorithms discussed above are also possible.

5.0. Implementation Mechanism—Hardware Overview

Figure 8:
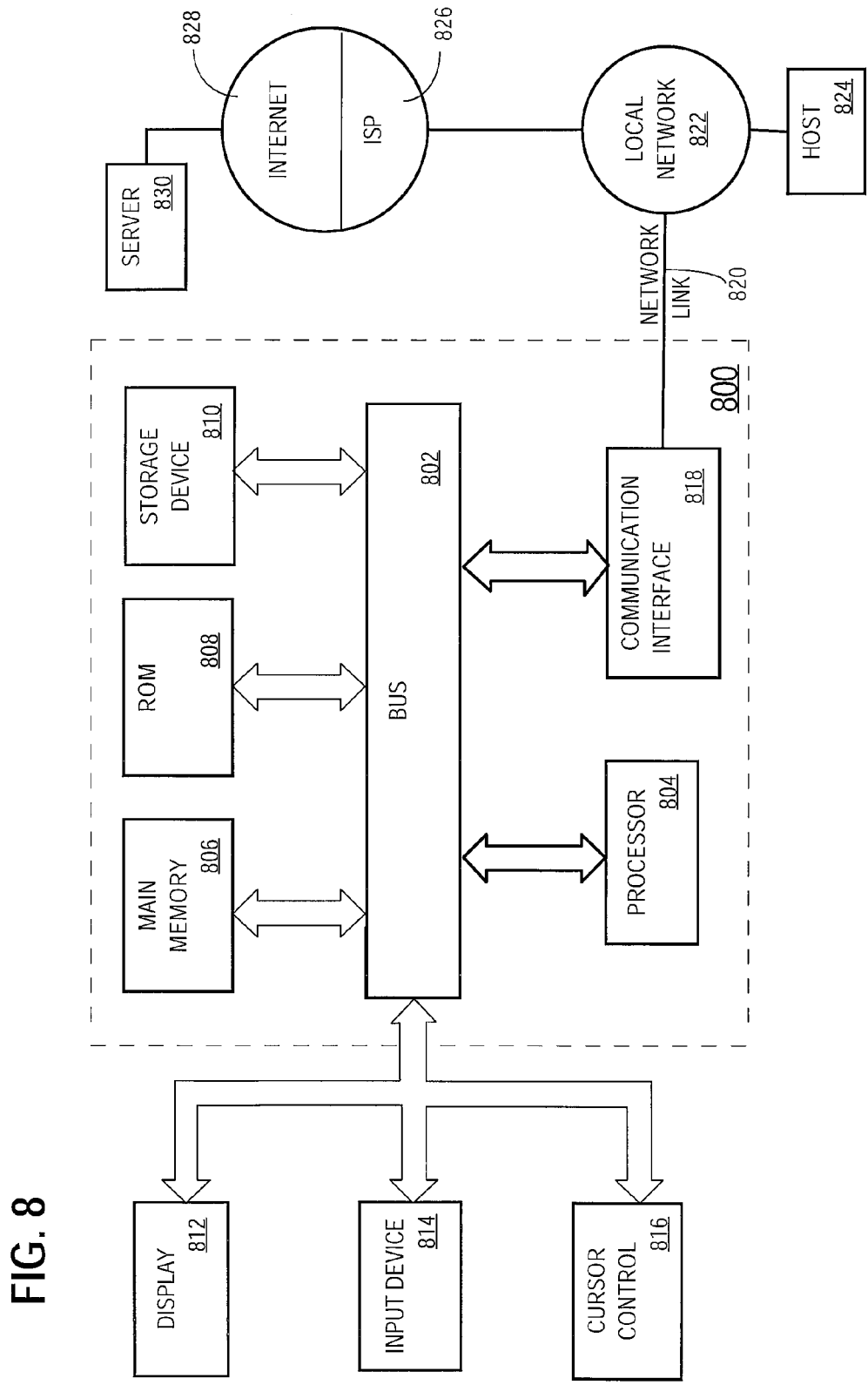
FIG. 8 is block diagram of a computer system upon which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining the relevance of a particular document to a particular query, the method comprising:

based on session information, identifying a plurality of query sessions for the particular query;
wherein, for each session in the plurality of query sessions, the session information comprises data indicating an ordered list of documents,
wherein the ordered list of documents was presented, in order, as a search results for the session;
for each session in the plurality of query sessions:
identifying click-through information associated with the session, wherein the click-through information comprises data indicating which one or more documents were selected by a user associated with the session from the ordered list of documents presented during the session;
estimating a score for the particular document relative to the particular query;
wherein the score for the particular document is based on, for each session of the plurality of query sessions in which the particular document was presented as a search result: click-through information indicating whether the particular document was selected in the session, and click-through information, for the same session, corresponding to other documents in the ordered list of documents that was presented during the session;
wherein the method is performed by one or more computing devices.

2. The method of claim 1, wherein the ordered list of documents presented as a search results for a first session of said plurality of query sessions is not identical to the ordered list of documents presented as a search results for a second session of said plurality of query sessions.

3. The method of claim 1, wherein estimating the score for the particular document comprises, for each particular session of one or more sessions of the plurality of sessions, based on the click-through information, for the same particular session, corresponding to the other documents in the ordered list of documents that was presented during the particular session, determining whether one or more documents, positioned after the particular document in the ordered list of documents that was presented during the session, were selected during the session.

4. The method of claim 1, wherein estimating the score for the particular document comprises:

for each particular session of one or more sessions of the plurality of sessions, inferring that a user corresponding to the particular session, having accessed the particular document, did not find the particular document relevant to the query in part because the click-through information for the particular session indicates: a) the user selected the particular document; and b) the user selected a document ordered after the particular document in the ordered list of documents that was presented during the session.

5. The method of claim 1, wherein estimating the score for the particular document comprises, based on the click-through information for each session of the plurality of sessions, estimating a probability that a given user will find the particular document actually relevant to the particular query given that the given user has selected the particular document.

6. The method of claim 1, wherein estimating the score for the particular document comprises, based on the click-through information for each session of the plurality of sessions, estimating a probability that the particular document will be selected in response to the particular query.

7. The method of claim 6, wherein:
estimating the score for the particular document comprises, based on the click-through information for each session of the plurality of sessions, estimating a probability that a given user will find the particular document actually relevant to the particular query given that the given user has selected the particular document; and
the score is a function of the probability that the particular document will be selected in response to the particular query and the probability that a given user will find the particular document actually relevant to the particular query given that the given user has selected the particular document.

8. The method of claim 1, wherein estimating the score for the particular document comprises, for each particular session of one or more sessions in the plurality of query sessions, inferring whether a particular user corresponding to the session examined information about the particular document based on whether the click-through information, for the particular session, indicates that the particular document was ordered before or at the position of the last document selected during the session from the ordered list of documents that was presented during the session.

9. The method of claim 1, wherein estimating the score for the particular document comprises generating a Dynamic Bayesian Network based on for each session of the plurality of query sessions in which the particular document was presented as a search result, both click-through information indicating whether the particular document was selected in the session and click-through information, for the same session, corresponding to other documents in the ordered list of documents that was presented during the session.

10. The method of claim 1, wherein estimating the score for the particular document further comprises generating a model, based on the click-through information for each of the plurality of query sessions, to estimate one or more probabilities modeled by the model, wherein the score is a function of the one or more probabilities.

11. The method of claim 10, wherein the model estimates the one or more probabilities for each of a plurality of documents that were presented in search results during the plurality of query sessions, wherein estimating one or more modeled probabilities comprises determining a maximum likelihood solution for the probabilities across the plurality of documents.

12. The method of claim 10, wherein the model estimates the one or more probabilities for each of a plurality of documents that were presented in search results during the plurality of query sessions, wherein estimating one or more modeled probabilities comprises executing an expectation maximization algorithm based on for each session of the plurality of query sessions in which the particular document was presented as a search result, both click-through information indicating whether the particular document was selected in the session and click-through information, for the same session, corresponding to other documents in the ordered list of documents that was presented during the session.

13. The method of claim 10, wherein the modeled probabilities include:
a probability that a given user will find the particular document actually relevant to the particular query given that the given user has selected the particular document; and
a probability that the particular document will be selected in response to the particular query.

14. The method of claim 13, wherein the model further includes, for each session in the plurality of sessions, for each position i of a document in the ordered list of documents:
a latent variable indicating whether or not the user associated with the session examined information about the document at the position i;
a latent variable indicating whether or not the user associated with the session accessed the document at the position i;
a latent variable indicating whether or not the user associated with the session, having examined the document, found the document at the position i relevant to the particular query.

15. The method of claim 14, wherein the model further comprises a probability that a given user will end a given query session without finding a document that is relevant to the particular query.

16. The method of claim 15, wherein the model is described by the equations:

$$A_i=1, E_i=1 <=> C_i=1 \quad (a)$$

$$P(A_i=1)=\alpha_\mu \quad (b)$$

$$E_i=0 => E_{i+1}=0 \quad (c)$$

$$S_i=1 => E_{i+1}=0 \quad (d)$$

$$P(S_i=1|C_i=1)=s_\mu \quad (e)$$

$$C_i=0 => S_i=0 \quad (f)$$

$$P(E_{i+1}=1|E_i=1;S_i=0)=\gamma \quad (g)$$

wherein:
$s_\mu$ is the probability that a given user will find the particular document actually relevant to the particular query given that the given user has selected the particular document;
$\alpha_\mu$ is the probability that the particular document will be selected in response to the particular query;
$E_i$ is the latent variable indicating whether or not the user associated with the session examined information about the document at the position i;
$A_i$ is the latent variable indicating whether or not the user associated with the session accessed the document at the position i;
$S_i$ is the latent variable indicating whether or not the user associated with the session, having examined the document, found the document at the position i relevant to the particular query;
$1-\gamma$ is the probability that a given user will end a given query session without finding a document that is relevant to the particular query; and
$C_i$ is, for each session in the plurality of sessions, for each position i of a document is the ordered list of documents, a known variable, based on the click-through information, indicating that the document at position i was selected.

17. The method of claim 1, further comprising:
identifying a training set of documents associated with the particular query; performing the steps of claim 1 for each document in the training set of documents to generate a set of scores;
determining target rankings for the training set of documents based on the set of scores;
using at least the target rankings as a target, learning a ranking function based on at least features of the set of documents;
ranking one or more search results based on the ranking function.

18. The method of claim 1, wherein the score for the particular document is based on at least one of:
an estimate of perceived relevance, wherein the estimate of perceived relevance is a function of, for each session of the plurality of query sessions in which the click-through data indicates that the user selected at least one of the particular document or a document positioned after the particular document in the ordered list of documents corresponding to the session, whether the click-through data indicates that the user selected the particular document; or
an estimate of satisfaction in the particular document, wherein the estimate of satisfaction is a function of, for each session of the plurality of query sessions in which the click-through data indicates that the user selected the particular document, whether the click-through data indicates that the user also selected a document positioned after the particular document in the ordered list of documents corresponding to the session.

19. The method of claim 1, wherein the score for the particular document is further based on information about the position of the particular document in the ordered list of documents that was presented as the search result for the session, and information about the positions of the other documents in the ordered list of documents that was presented during the same session.

20. One or more non-transitory computer-readable media storing instructions that, when executed by one or more computing devices, cause performance of:
based on session information, identifying a plurality of query sessions for the particular query;
wherein, for each session in the plurality of query sessions, the session information comprises data indicating an ordered list of documents, wherein the ordered list of documents was presented, in order, as a search result for the session;
for each session in the plurality of query sessions:
identifying click-through information associated with the session, wherein the click-through information comprises data indicating which one or more documents were selected by a user associated with the session from the ordered list of documents presented during the session;
estimating a score for the particular document relative to the particular query;
wherein the score for the particular document is based on, for each session of the plurality of query sessions in which the particular document was presented as a search result: click-through information indicating whether the particular document was selected in the session, and click-through information, for the same session, corresponding to other documents in the ordered list of documents that was presented during the session.

21. The one or more non-transitory computer-readable media of claim 20, wherein estimating the score for the particular document comprises, for each particular session of one or more sessions of the plurality of sessions, based on the click-through information, for the same particular session, corresponding to the other documents in the ordered list of documents that was presented during the particular session, determining whether one or more documents, positioned after the particular document in the ordered list of documents that was presented during the session, were selected during the session.

22. The one or more non-transitory computer-readable media of claim 21, wherein generating a score for the particular document comprises:
for each particular session of one or more sessions of the plurality of sessions, inferring that a user corresponding to the particular session, having accessed the particular document, did not find the particular document relevant to the query in part because the click-through information for the particular session indicates: a) the user selected the particular document; and b) the user selected a document ordered after the particular document in the ordered list of documents that was presented during the session.

23. The one or more non-transitory computer-readable media of claim 20,
wherein estimating the score for the particular document comprises generating a model, based on the click-through data for each of the plurality of query sessions to estimate one or more probabilities modeled by the model, wherein the score is a function of the one or more probabilities.

24. The one or more non-transitory computer-readable media of claim 23, wherein the model includes: a probability that a given user will find the particular document actually relevant to the particular query given that the given user has selected the particular document, a probability that the particular document will be selected in response to the particular query, and for each session in the plurality of sessions, for each position i of a document in the ordered list of documents:
a latent variable indicating whether or not the user associated with the session examined information about the document at the position i;
a latent variable indicating whether or not the user associated with the session accessed the document at the position i;
a latent variable indicating whether or not the user associated with the session, having examined the document, found the document at the position i relevant to the particular query.

25. The one or more non-transitory computer-readable media of claim 24, wherein the model further comprises a probability that a given user will end a given query session without finding a document that is relevant to the particular query.

26. The one or more non-transitory computer-readable media of claim 25, wherein the model is described by the equations:

$$A_i=1, Ei=1 <=> C_i=1 \quad \text{(g)}$$

$$P(A_i=1)=\alpha_\mu \quad \text{(h)}$$

$$E_i=0 => E_{i+1}=0 \quad \text{(i)}$$

$$S_i=1 => Ei+1=0 \quad \text{(j)}$$

$$P(S_i=1|C_i=1)=s_\mu \quad (k)$$

$$C_i=0 => S_i=0 \quad (l)$$

$$P(E_{i+1}=1/E_i=1;S_i=0)=\gamma \quad (g)$$

wherein:

$s_\mu$ is the probability that a given user will find the particular document actually relevant to the particular query given that the given user has selected the particular document;

$\alpha_\mu$ is the probability that the particular document will be selected in response to the particular query;

$E_1$ is the latent variable indicating whether or not the user associated with the session examined information about the document at the position i;

$A_i$ is the latent variable indicating whether or not the user associated with the session accessed the document at the position i;

$S_i$ is the latent variable indicating whether or not the user associated with the session, having examined the document, found the document at the position i relevant to the particular query;

$1-\gamma$ is the probability that a given user will end a given query session without finding a document that is relevant to the particular query; and $C_i$ is, for each session in the plurality of sessions, for each position i of a document is the ordered list of documents, a known variable, based on the click-through information, indicating that the document at position i was selected.

27. The one or more non-transitory computer-readable media of claim 20, further comprising instructions that, when executed by the one or more computing devices, cause:

identifying a training set of documents associated with the particular query;

executing the instructions of claim 20 for each document in the training set of documents to generate a set of scores;

determining target rankings for the training set of documents based on the set of scores;

using at least the target rankings as a target, learning a ranking function based on at least features of the set of documents;

ranking one or more search results based on the ranking function.

28. The one or more non-transitory computer-readable media of claim 20, wherein the score for the particular document is based on at least one of:

an estimate of perceived relevance, wherein the estimate of perceived relevance is a function of, for each session of the plurality of query sessions in which the click-through data indicates that the user selected at least one of the particular document or a document positioned after the particular document in the ordered list of documents corresponding to the session, whether the click-through data indicates that the user selected the particular document; or an estimate of satisfaction in the particular document, wherein the estimate of satisfaction is a function of, for each session of the plurality of query sessions in which the click-through data indicates that the user selected the particular document, whether the click-through data indicates that the user also selected a document positioned after the particular document in the ordered list of documents corresponding to the session.

29. The one or more non-transitory computer-readable media of claim 20, wherein the score for the particular document is further based on information about the position of the particular document in the ordered list of documents that was presented as the search result for the session, and information about the positions of the other documents in the ordered list of documents that was presented during the same session.

* * * * *